United States Patent [19]
Saegusa et al.

[11] Patent Number: 5,353,093
[45] Date of Patent: Oct. 4, 1994

[54] CONTROL SYSTEM FOR AN APPARATUS USING A MICROCOMPUTER

[75] Inventors: Takashi Saegusa; Seiichi Yasukawa, both of Kawasaki, Japan

[73] Assignee: Nikon Corporation, Tokyo, Japan

[21] Appl. No.: 102,800

[22] Filed: Aug. 6, 1993

[30] Foreign Application Priority Data

Aug. 19, 1992 [JP] Japan .................................. 4-220262

[51] Int. Cl.$^5$ .............................................. G03B 7/26
[52] U.S. Cl. .................................. 354/412; 354/267.1
[58] Field of Search ............. 354/412, 266, 458, 267.1

[56] References Cited

U.S. PATENT DOCUMENTS

4,509,843  4/1985  Hasegawa et al. ................... 354/412
5,255,046 10/1993  Kawasaki et al. ................... 354/412
5,296,889  3/1994  Imai ................................ 354/412 X Primary Examiner—W. B. Perkey
Attorney, Agent, or Firm—Shapiro and Shapiro

[57] ABSTRACT

A control system comprises a reset unit for outputting a reset output by the manipulation of a manually operable member, a first microcomputer adapted to be reset by the reset output, a second microcomputer, and a controller for deactivating the second microcomputer. The controller deactivates the second microcomputer in accordance with the outputs of the first microcomputer and the second microcomputer. When there is no output from the second microcomputer, the controller deactivates the second microcomputer in response to the output of the first microcomputer determining no response from the second microcomputer.

4 Claims, 7 Drawing Sheets

CONTROL SYSTEM FOR AN APPARATUS USING A MICROCOMPUTER

BACKGROUND OF THE INVENTION

1. Field of the Invention

The present invention relates to a control system for an apparatus using a microcomputer.

2. Related Background Art

In a prior art apparatus using a microcomputer, a power supply control is also done by the microcomputer. In such an apparatus, if the microcomputer overruns, there is a risk that the power cannot be cut off.

SUMMARY OF THE INVENTION

It is an object of the present invention to provide a power supply control method which permits the recovery even if the microcomputer overruns.

In order to achieve the above object, in accordance with the present invention, there are provided reset means for outputting a reset output by the manipulation of a manually operable member, a first microcomputer adapted to be reset by the reset means, a second microcomputer not reset by the reset means and capable of continuing the processing, and control means for deactivating the second microcomputer. The control means deactivates the second microcomputer in accordance with the outputs of the first microcomputer and the second microcomputer. Even if the second microcomputer does not produce the output, the second microcomputer is deactivated by the output of the first microcomputer when the first microcomputer determines no response from the second microcomputer.

In the present invention, even if the first microcomputer overruns, it may be recovered by the reset means by operating the manually operable member by the operator, and even if the second microcomputer overruns, it may be reset by the first microcomputer. Even if the reset means is inadvertently activated, the second microcomputer does not stop the operation.

DETAILED DESCRIPTION OF THE PREFERRED EMBODIMENTS

An embodiment of the present invention applied to a control apparatus for a camera is now explained.

Figure 1:
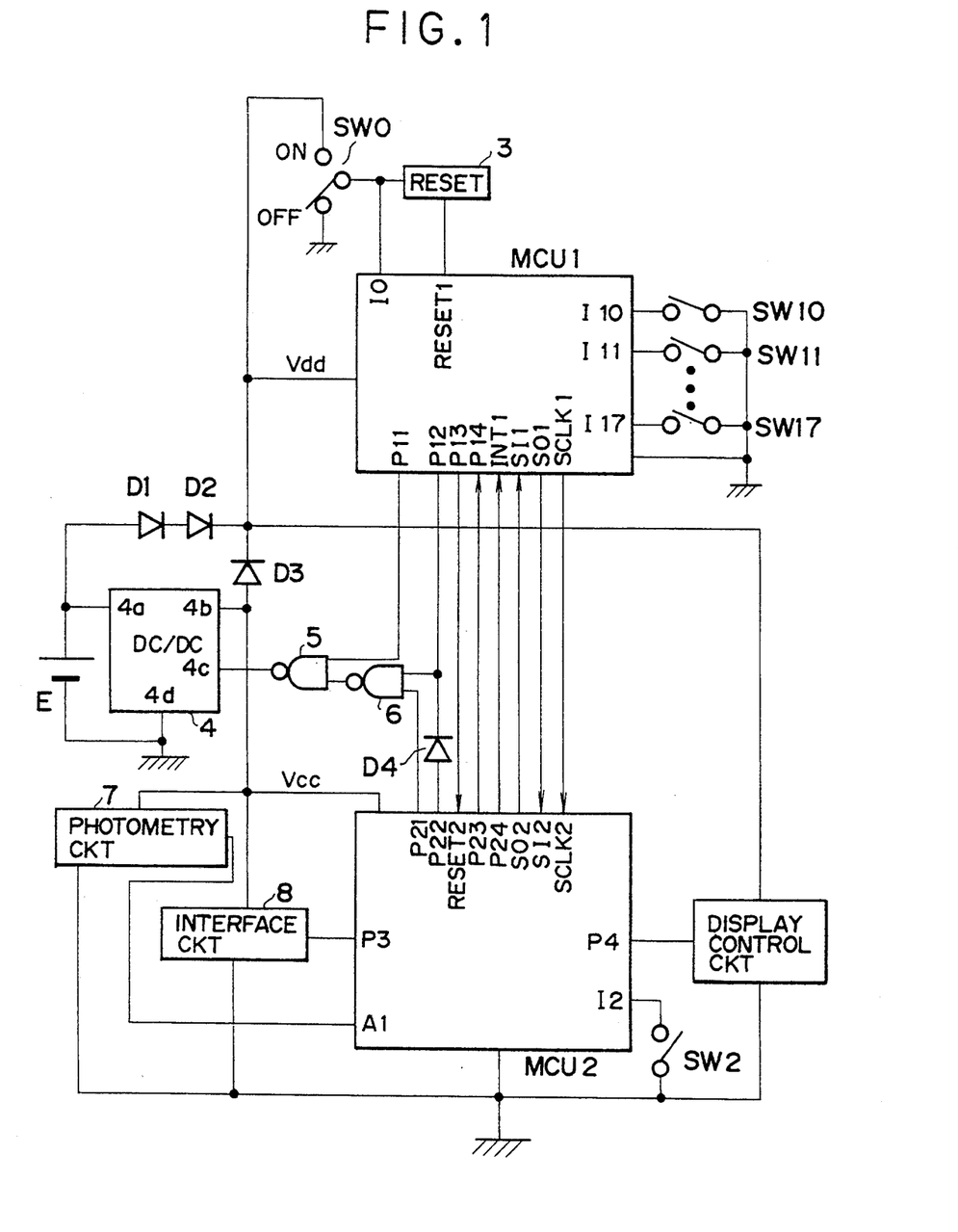
FIG. 1 shows a block diagram of an embodiment of the present invention.

FIG. 1 shows a block diagram of an embodiment of the present invention.

In FIG. 1, MCU1 and MCU2 denote microcomputers which are hereinafter referred to as MCU1 and MCU2. A reset circuit 3 resets the MCU1. It renders a reset input terminal of the MCU1 to L to reset the MCU1 when a Vdd terminal connected to a battery rises or when a main switch SW0 is switched from an ON position to an OFF position.

Numeral 4 denotes a DC/DC converter. When a power supply voltage of a battery E is applied between an input terminal 4a and a GND terminal 4d, a predetermined voltage Vcc (for example, 5 volts) is generated at an output terminal 4b if an input to a control terminal 4c is L, and the output of Vcc is zero if the input is H. A diode D1 and a diode D2 are connected in series to generate a voltage which is lower than the battery voltage by two-diode voltage.

On the other hand, a voltage substantially equal to Vcc is generated at a cathode of a Schttoky diode D3 having anode thereof connected to the output terminal 4b. The voltage Vdd generated at the junction of the diode D3 and the diode D2 is the voltage Vcc which is lower than the battery voltage by the two-diode voltage or the higher voltage Vcc.

An output P11 of the MCU1 and an output of a NAND gate 6 are supplied to a NAND gate 5 and an output terminal thereof is connected to the terminal 4c of the DC/DC converter 4. A terminal P12 of the MCU1 and a terminal P21 of the MCU2 are connected to the NAND gate 6. A terminal P22 of the MCU2 is an input terminal which is connected to the terminal P12 of the MCU1 through a diode D4 to read a status of the terminal P12.

When the terminal P11 is L, the output of the NAND 5 is H without regard to the NAND gate 6. When both of the terminal P12 and the terminal P21 are H, the output of the NAND 6 is L and the output of the NAND 5 is H without regard to the terminal P11. When at least one of the terminal P12 and the terminal P21 is L, the output of the NAND gate 6 is H, and when the terminal P11 is H, the output of the NAND 5 is L. A truth value table shown in Table 1 is produced by the NAND gate 5 and the NAND gate 6.

TABLE 1

| Status | P11 | P12 | P21 | NAND 5 OUTPUT |
| --- | --- | --- | --- | --- |
| A | L | X | X | H |
| B | X | H | H | H |
| C | H | L | X | L |
|   | H | X | L | L |

When the output of the NAND 5 is H, the DC/DC converter 4 is turned off and the application of Vdd is stopped. Namely, the terminal P11 functions as a forced off signal and the status A shows a forced off status. When the forced off signal is inactive, L at the terminal P12 or the terminal P21 renders the output of the NAND 5 to L to turn on the DC/DC converter 4. The terminal P12 or the terminal P21 functions as a power hold signal and the status C shows a power hold status. When both of the power hold signals are H, the output of the NAND 5 is H and the DC/DC converter 4 is turned off. This is a normal off status.

SW0 denotes a main switch which is connected to GND in its off position and connected to Vdd in its on position. The output thereof is connected to the reset means 3 and the MCU1.

SW10 to SW17 denote setting switches which are connected to input ports I10 to I17 of the MCU1. SW2 denotes a shutter release switch which is connected to the terminal I2 of the MCU2. A photo-metering circuit 7 is connected to an A/D conversion input A1 of the MCU2. An interface circuit 8 of the MCU2 is connected to a port P3 of the MCU2 and a motor and a shutter magnet, not shown, are driven by P3. A display control circuit 9 is connected to a port P4 of the MCU2 and displays on an LCD by the output P4.

Figures 2A, 2B:
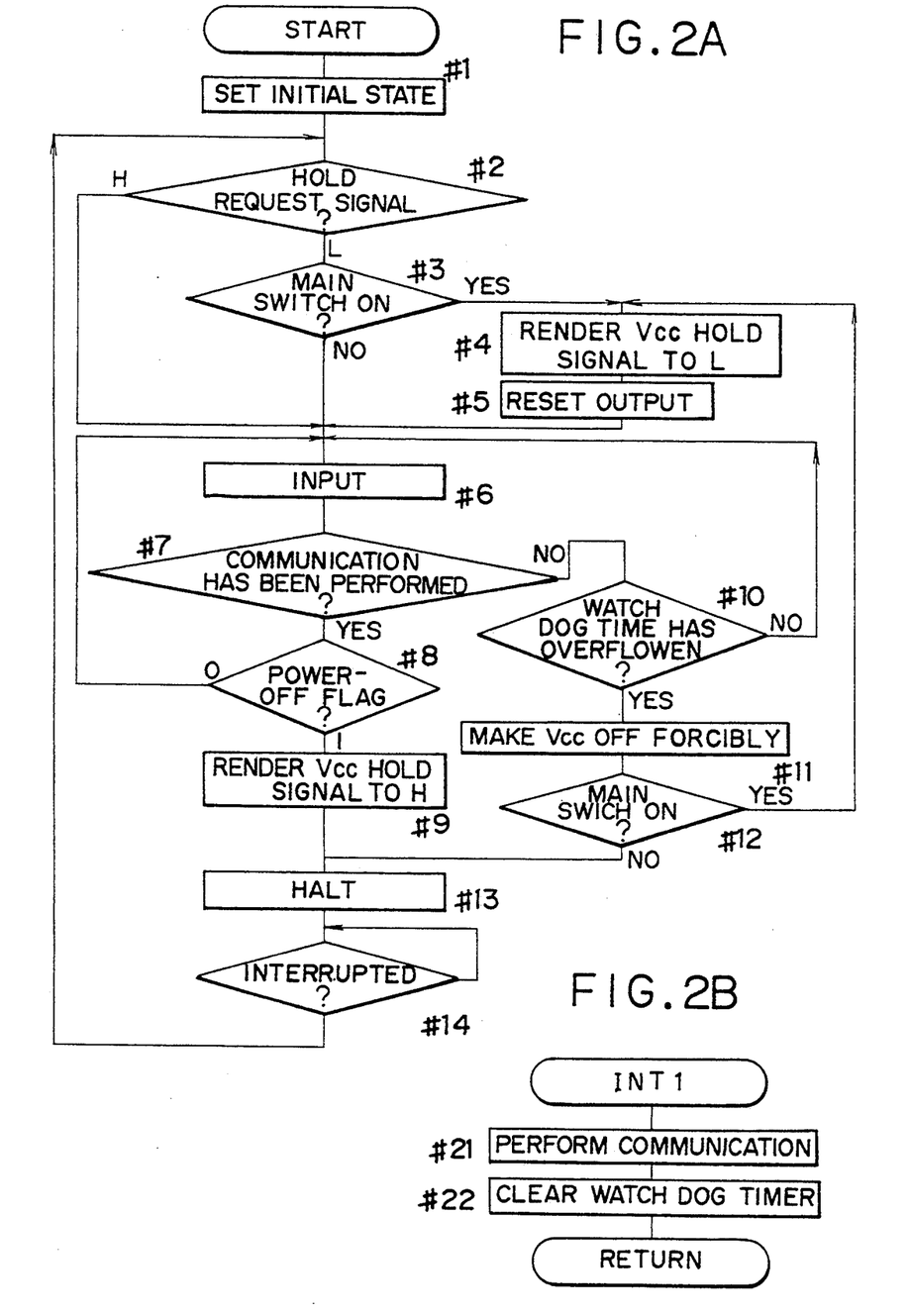
FIG. 2A shows a flow chart of a main routine of an MCU1.
FIG. 2B shows a flow chart of an interruption routine of the MCU1.

FIG. 2A shows a flow chart of a main routine of the MCU1.

When a battery is loaded and the power supply voltage Vdd is supplied and the main switch SW0 is switched from the on position to the off position, the reset circuit produces a reset signal and the MCU1 starts the process from a step #1. At the time of reset, all output terminals of the MCU1 are H.

In the step #1, a memory and registers are initialized and the process proceeds to a step #2.

In the step #2, whether P23 (hold request signal) of the MCU2 is L or not is checked by the terminal P14, and if it is L, the process proceeds to a step #3, and if it is H, the process proceeds to a step #6.

In the step #3, whether the main switch SW0 is in the on position or the off position is checked by the input terminal I0, and if it is in the on position, the process proceeds to a step #4 and if it is in the off position, the process proceeds to the step #6.

In a step #4, the terminal P12 (power hold signal) is rendered L and the output Vcc of the DC/DC converter 4 is generated.

In a step #5, a reset output is supplied to the MCU2 by the terminal P13.

In a step #6, the status of SW10 to SW17 are inputted by the input terminals I10 to I17. The status is transferred to the MCU2 in an interruption routine of FIG. 2B.

In a step #7, whether the communication has been made with the MCU2 or not is checked, and if the communication has been made, the process proceeds to a step #8, and if the communication has not been made, the process proceeds to a step #10.

In a step #8, whether a power off flag transferred from the MCU2 is "1" or not is checked, and if it is "0", the process returns to the step #6, and if it is "1", the process proceeds to a step #9.

In a step #9, the terminal P21 (power hold signal) is rendered to H.

In a step #10, whether a watch dog timer has overflown or not is checked and if it has overflown, the process proceeds to a step #11, and if it has not overflown, the process returns to the step #6.

In a step #11, the terminal P11 (forced of signal) is rendered to L and the output Vcc of the DC/DC converter 4 is forcibly turned off.

In a step #12, the on/off position of the main switch is checked, and if it is in the on position, the process returns to the step #4, and if it is in the off position, the process proceeds to a step #13.

In a step #13, the MCU1 is rendered to a halt status. In the halt status, a clock of the MCU1 is stopped and power consumption is suppressed. If the DC/DC converter 4 is also turned off, the power consumption is minimum. At this time, only the interruption by key on wake-up of I0 and I10 to I17 is effective.

In a step #14, the interruption by the key on wake-up of I0 or I10 to I17 is monitored. When the setting member is actuated and one of the switches SW0 or SW10 to SW17 is turned on, the terminal corresponding to I0 or I10 to I17 is rendered to L and a start interruption is made, and the process returns to the step #2.

FIG. 2B shows a flow chart of an interruption routine of the MCU1. When the MCU2 starts the communication and the terminal P24 is rendered to L, an interruption input terminal INT1 of the MCU1 is rendered to L and the MCU1 enters into the interruption routine.

In a step #21, serial communication is conducted by serial output terminal SO1, a serial input terminal SI1, and a serial clock terminal SCLK1. The status of SW10 to SW17 supplied in the step #6 is conveyed from the MCU1 to the MCU2, and flag information such as a power of flag is conveyed from the MCU2 to the MCU1.

In a step #22, the watch dog timer is cleared. Namely, if the communication is normal, it does not happen that the process proceeds from the step #10 to the step #11 to forcibly turn off Vcc.

Figure 3:
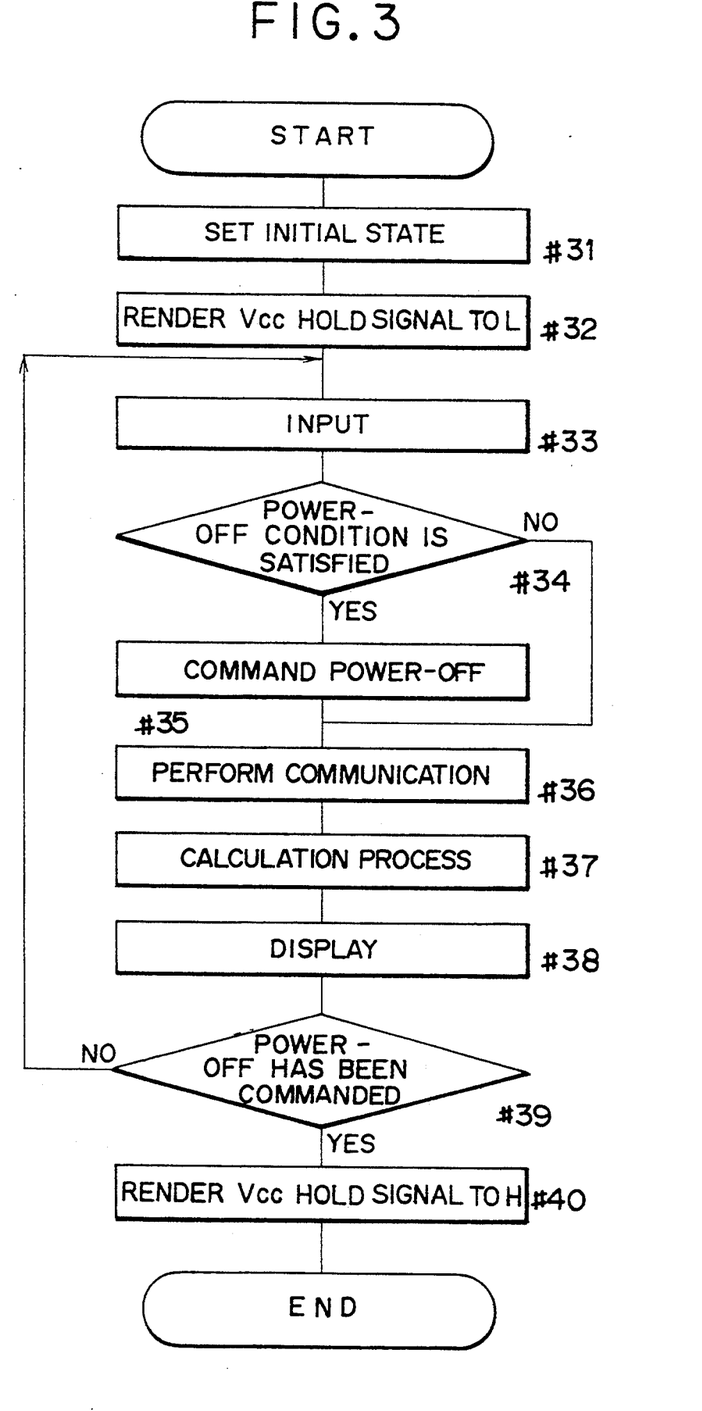
FIG. 3 shows a flow chart of a main routine of an MCU2.

FIG. 3 shows a flow chart of a main routine of the MCU2.

When the DC/DC converter 4 is turned on and Vcc is applied and the reset output by P13 of the MCU1 is applied to the reset input RESET2 of the MCU2, the MCU2 starts the processing.

In a step #31, initialization is made. In a step #32, the terminal P21 (power hold terminal) is rendered to L so that the power is held so long as the MCU1 is not forcibly turned off.

In a step #33, A/D converted value of the output of the photo-metering circuit 7 is determined from the A/D conversion input terminal A1.

In a step #34, the power-off condition is discriminated. If the power-off condition is met, the process proceeds to a step #35, and if the power-off condition is not met, the process proceeds to a step #36. The power-off condition includes the following two conditions. 1) The main switch SW0 is switched to the off position. 2) A predetermined time Tx has elapsed since none of the setting switches SW10 to SW17 has been actuated.

In a step #35, the power of flag is rendered to "1" to set the power off command to the MCU1.

In a step #36, the terminal P24 is rendered to L to conduct the serial communication with the MCU1. Known serial communication by the serial output terminal SO2, the serial input terminal SI2 and the serial clock terminal SCLK2 is conducted. At this time, the status of SW10 to SW17 supplied in the step #6 is conveyed from the MCU1 to the MCU2, and the flag information such as power off flag is conveyed from the MCU2 to the MCU1.

In a step #37, the switch information acquired from the MCU1 in the step #36 is modified and an apex operation is made by the A/D converted value determined in the step #33. In a step #38, the port P4 is driven and the display output of the result of the process in the step #37 is transferred to the display circuit 9 for display.

In a step #39, whether the power-off has been commanded or not is checked and if it has, the process proceeds to a step #40, and if it has not, the process returns to the step #33. The above steps are repeated.

In a step #40, the terminal P21 (power hold signal) is rendered to H. If the power hold signal (P12) of the MCU1 is also H, the output Vcc of the DC/DC converter 4 is turned off as shown in Table 1.

Figure 4:
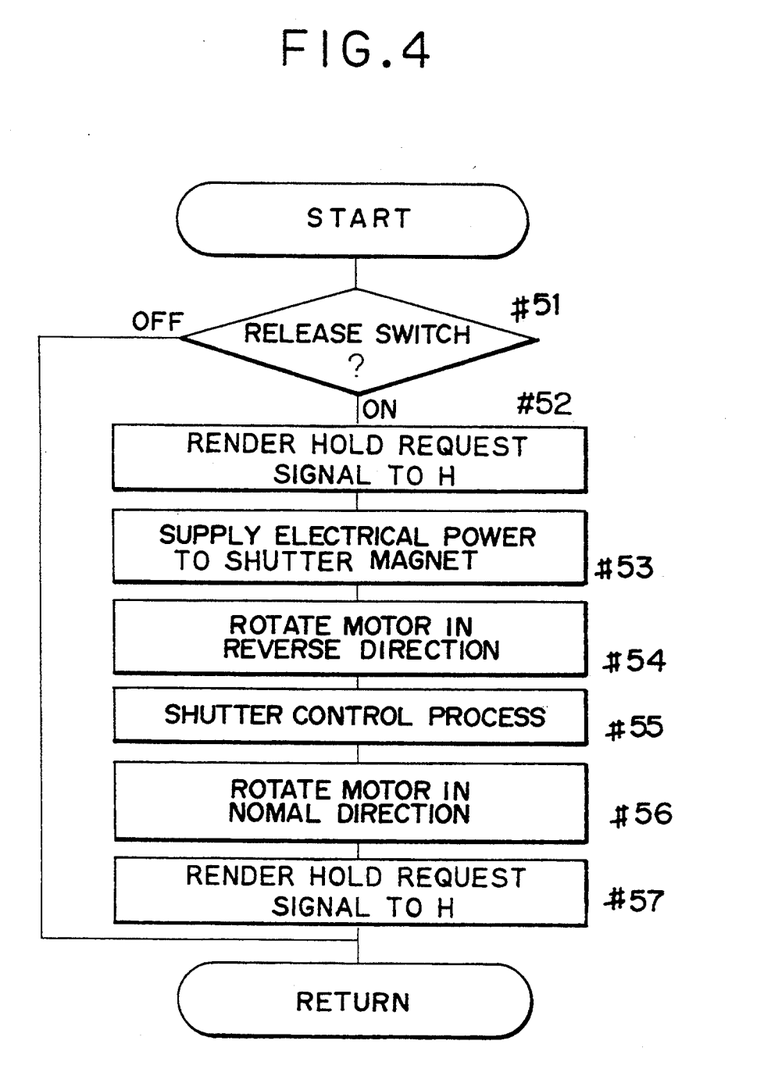
FIG. 4 shows a flow chart of a timer interruption routine of the MCU2.

FIG. 4 shows a flow chart of a timer interruption routine of the MCU2. The process is switched to the present routine in the course of the main routine of FIG. 3 by the one millisecond timer interruption.

In a step #51, the on/off position of the release switch SW2 is checked, and if it is in the off position, the process returns to the main routine, and if it is in the off position, the process proceeds to a step #52 to start the release sequence.

In a step #52, the terminal P23 (hold request signal) is rendered to H. In a step #53, the circuit 8 is activated by the terminal P3 to energize Mg which is linked to a leading curtain and a trailing curtain of a shutter, not shown, to latch the shutter by an electrical system.

In a step #54, the circuit 8 is activated to backwardly drive a motor, not shown, to move up a mirror. An iris is also controlled during this period.

Figure 5:
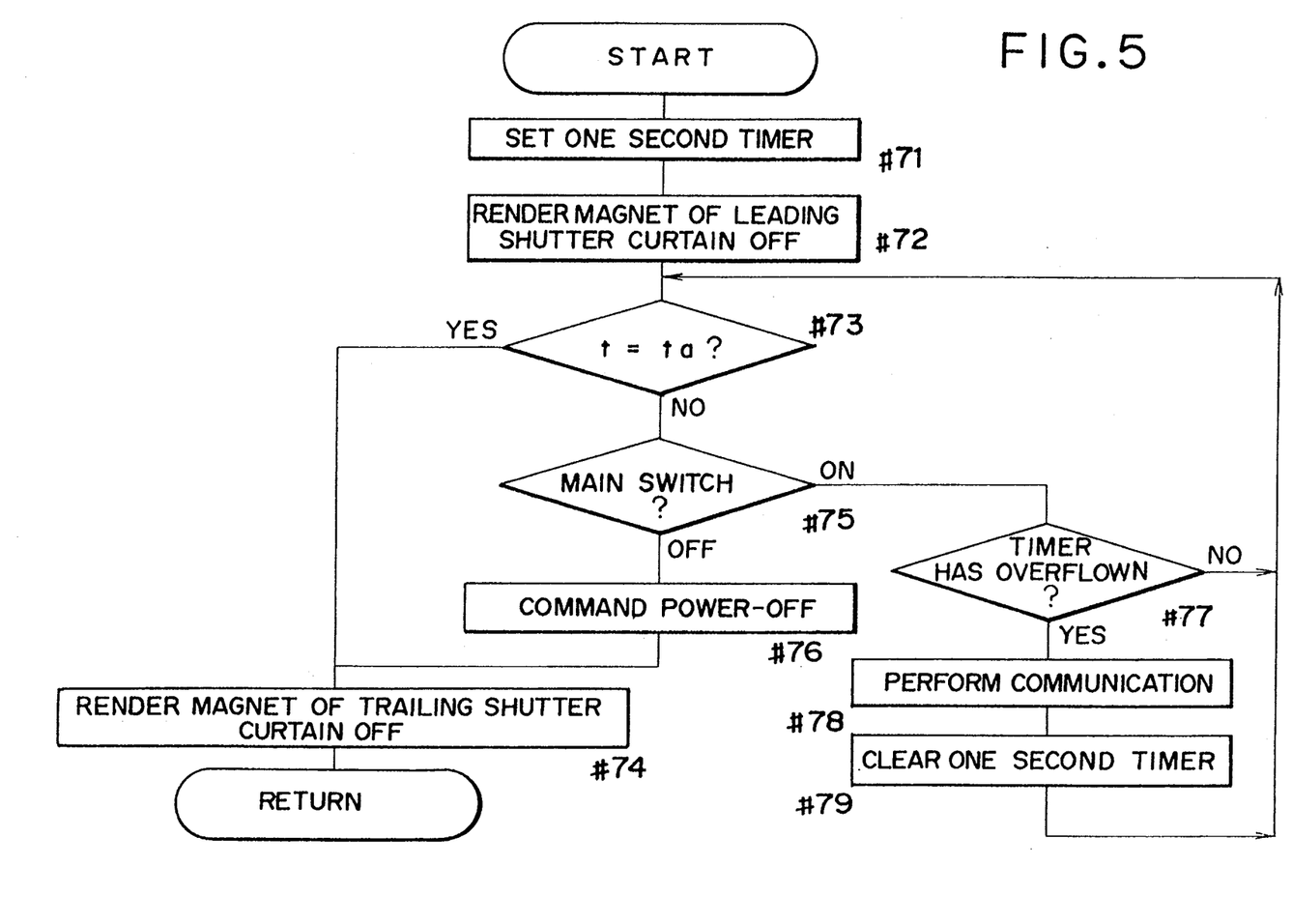
FIG. 5 shows a flow chart of a shutter control routine which is sub-routine-called from a step #55 of FIG. 4.

In a step #55, a shutter control routine of FIG. 5 is sub-routine-called to control to the shutter speed determined in the step #37 of FIG. 3.

In a step #56, the circuit 8 is activated to drive the motor forwardly to move down the mirror. In a step #57, a series of release sequence is completed and the terminal P23 (hold request signal) is rendered to L and the process returns. FIG. 5 shows a flow chart of the shutter control routine which is sub-routine-called from the step #55 of FIG. 4.

In a step #71, a one second timer which defines a communication interval to the MCU1 which is in the course of shutter control is set.

In a step #72, the circuit 8 is activated to deenergize the leading curtain magnet to cause the leading curtain of the shutter to run.

In a step #73, whether the shutter time ta determined in the step #37 of FIG. 3 has elapsed or not is checked, and if it has, the process proceeds to a step #74, and if it has not, the process proceeds to a step #57.

In a step #74, the circuit 8 is activated to deenergize the trailing curtain magnet to cause the shutter trailing curtain to run, and the shutter control is terminated.

In a step #75, whether the main switch has been turned off or not is checked. The main switch SW0 is not directly connected to the MCU2 but when the main switch is in the off position, the MCU1 is reset by the reset circuit 3 and the terminal P12 of the MCU1 is rendered from L to H so that it can be monitored by the terminal P22 of the MCU2. When the main switch is turned off, the process proceeds to a step #76, and if it remains in the on position, the process proceeds to a step #77.

In a step #76, the power off flag is set to "1" to set the power off command, and the process proceeds to a step #74.

In a step #77, the overflow of the one second timer is checked, and if it overflows, the process proceeds to a step #78, and if it does not overflow, the process returns to the step #73.

In a step #73, the communication with the MCU1 is conducted. This is not necessarily a perfect serial communication like the step #36 of FIG. 3. Since the watch dog timer of the MCU1 can be cleared by the communication interruption to the MCU1 by at least the terminal P24, the forced turn-off of Vcc can be avoided.

In a step #79, the one second timer is cleared and the process returns to the step #73.

Figure 6:
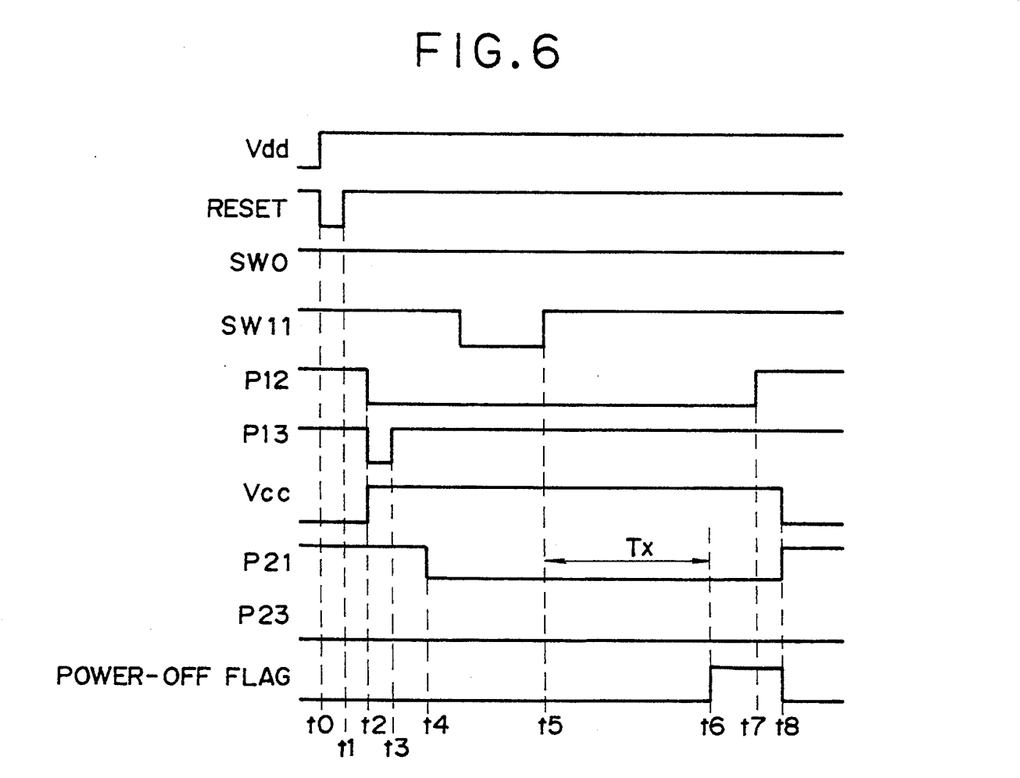
FIG. 6 shows a timing chart stating from the turn-on of a main switch.

FIG. 6 shows a timing chart which is started by the reset of the MCU1 by the loading of the battery.

At a time t0, the battery is loaded and the reset circuit 3 renders the reset terminal of the MCU1 to L until a time t1 to reset it. Then, the MCU starts the process of FIG. 2A.

In the step #1, initialization is made. Since the hold request signal ( P23 ) is now L, the decision of the step #2 is to proceed to the step #3. Since the main switch SW0 is in the on position, the process proceeds to the step #4. When the Vcc hold signal (P12) is rendered to L at a time t2, the DC/DC converter is turned on and the Vcc output is generated. In the following step #5, the reset output (P13) to the MCU2 is rendered to L.

At a time t3, the reset terminal of the MCU2 is rendered to H and the MCU2 starts the main routine of FIG. 3. In the step #31, the initialization is made and in the step #32, the Vcc hold signal (P21) is rendered to L (at a time t4).

The MCU1 resets the MCU2 and conducts the input process of the step #6. In the step #7, the presence or absence of communication is checked, but since the communication is not immediately started, the process proceeds to the step #10. Since the watch dog timer does not immediately overflow, the process returns to the step #6 and the above process is repeated.

The MCU2 conducts the input process of the step #33, and in the step #34, the power off condition is checked. Since the main switch is in the on position and the time Tx has not been elapsed since the setting switch has not been manipulated, the process proceeds to the step #36 to render P24 to L to conduct the communication with the MCU1. Then, INT1 of the MCU1 is rendered to L and the MCU1 starts the interruption of FIG. 2B.

In the step #21, the communication process is conducted and in the step #24, the watch dog timer is cleared and the process returns. Thus, the loop of the steps #6–#7–#10–#6 can proceed from the step #7 to the step #8. However, since the power off flag is still "0", the process returns from the step #8 to the step #6.

After the step #36, the MCU2 conducts the operation of the step #37 and the display process of the step #38. Since the power off command is not yet issued, the process returns from the step #39 to the step #33 and the above process is repeated.

For example, when the setting switch SW11 which has been in the on position is switched to the off position (at a time t5) and other switches are in the off position, this status is detected by the MCU2 by the communication with the MCU1, and after the elapse of the time Tx, the MCU2 proceeds from the step #34 to the step #35 and the power off flag is set to "1" (at a time t6). Then, it is conveyed from the MCU2 to the MCU1 by the communication process of the step #36. Then, when the MCU1 determines the step #8, it proceeds to the step #9 to render the Vcc hold signal (P12) to H (at a time t7).

Since the power hold signal (F21) by the MCU2 is now H, Vcc is held as shown in Table 1. The MCU1 proceeds to the step #13 to stop the oscillation and assume the halt status. Next process is not conducted unless a start interruption is made.

In the decision of the step #39 after the power off command has been issued, the MCU2 proceeds to the step #40. The Vcc hold signal (P21) is rendered to H (at a time t8) and the status B of Table 1 is assumed. Thus, Vcc is in the off status and the application of the power supply to the MCU2 is cut off.

Figure 7:
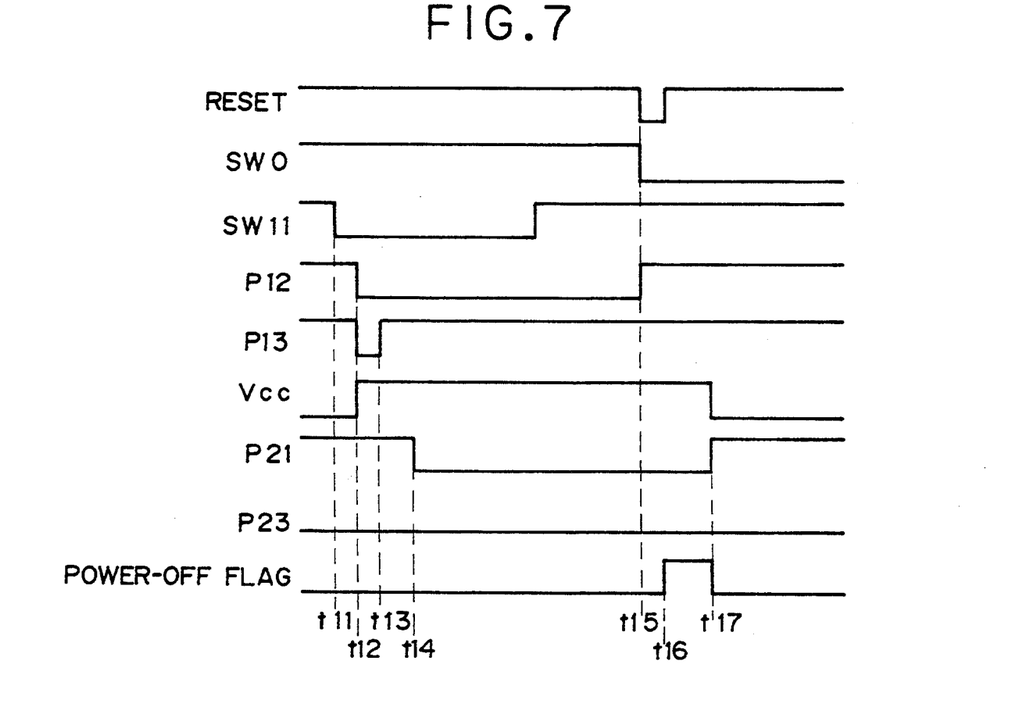
FIG. 7 shows a timing chart starting from the turn-on of a setting switch.

FIG. 7 shows a timing chart started by the turn-on of the setting switch.

The status before t11 in FIG. 7 is same as that after t8 in FIG. 6. When the setting switch SW11 is again turned on, the key on wake-up function of the MCU1 operates to start the oscillation, and the MCU1 again starts the processing. In the step #14, since the start interruption is present, the process returns to the step #2.

Then, as in the case of FIG. 6, the steps #2-#3-#4-#5 are executed. Namely, when P12 is rendered to L at a time t12, Vcc is turned on and the MCU2 is reset by P13 until a time t13.

On the other hand, the MCU2 also executes the steps #31 to #32 and the power hold by the MCU2 is conducted at a time t14.

When the main switch SW0 is turned off even if the setting switch SW11 is in the on position, the condition in the step #34 of the MCU2 is determined as the power off and the process proceeds to the step #35. In the step #35, the power off flag is set to "1" at a time t16, and it is conveyed to the MCU1 by the communication process of the step #36.

As in the case of FIG. 6, the MCU1 proceeds from the step #8 to the step #9 and renders the terminal P12 to H at a time t17. On the other hand, the MCU2 proceeds from the step #39 to the step #40 at the time t17 to render the terminal P21 to H. At this time, the status B of Table 1 is assumed and Vcc is turned off. The times of changes of the terminal P12 and the terminal P21 may be different. If the time for the terminal P12 to be rendered to H is delayed, Vcc is turned off at that time.

Figure 8:
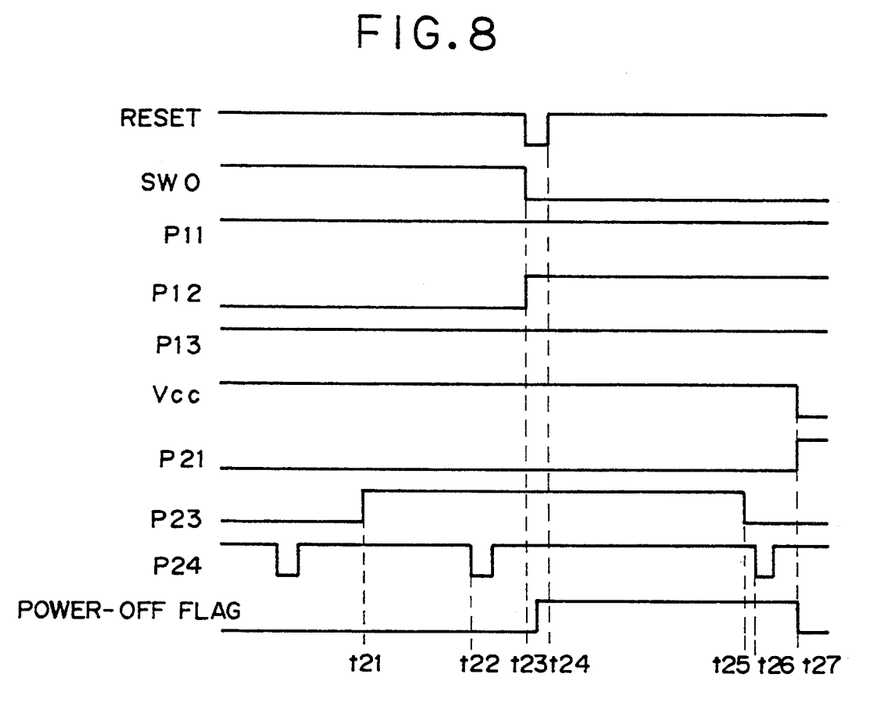
FIG. 8 shows a flow chart in a normal case when the main switch is turned off in a release sequence.

FIG. 8 shows a flow chart in a normal case in which the main switch is turned off in the release sequence.

Before the release, P24 is rendered to L by the communication routine of the step #36 of FIG. 3 at a constant timing. When the release switch is turned on, the process proceeds from the step #51 to the step #52 in the interruption routine to render the hold request signal (P23) to H (t21).

Then, the process proceeds to the shutter control routine of the step #55 to conduct the process of FIG. 5. If the shutter time is long, the process proceeds from the step #77 to the step #78 for each one-second overflow of the one second timer which has been set in the step #71 to render the terminal P23 to L and communicate with the MCU1 (t22). If the main switch is turned off (t23) to release the long shutter time in the course thereof, the reset by the reset circuit 3 is conducted to the MCU1.

When the reset is released at a time t24, the MCU1 initializes in the step #1 and proceeds to the step #2. In the step #2, whether P23 (hold request signal) is L or not is checked. Since it is H, the process from the step #7 is conducted and the resetting to the MCU2 is not conducted.

On the other hand, when the MCU1 is reset by the main switch (t23), all terminals of the MCU1 are rendered to H so that the MCU2 can detect it by the change at the terminal P12. The MCU2 proceeds from the step #75 to the step #76 and sets the power off flag to "1", proceeds to the step #74 to deenergize the trailing curtain magnet. Then, the shutter control routine is terminated.

In the step #56 of FIG. 3, the motor is forwardly driven, and in the step #57, the hold request signal is rendered to L (t25) and the interruption routine of FIG. 4 is terminated. When the MCU2 returns to the main routine of FIG. 3, it communicates with the MCU1 in the step #36 (t26) to convey the power off flag "1".

Then, the MCU2 proceeds from the step #39 to the step #40 to render P21 (Vcc hold signal) to H.

Figure 9:
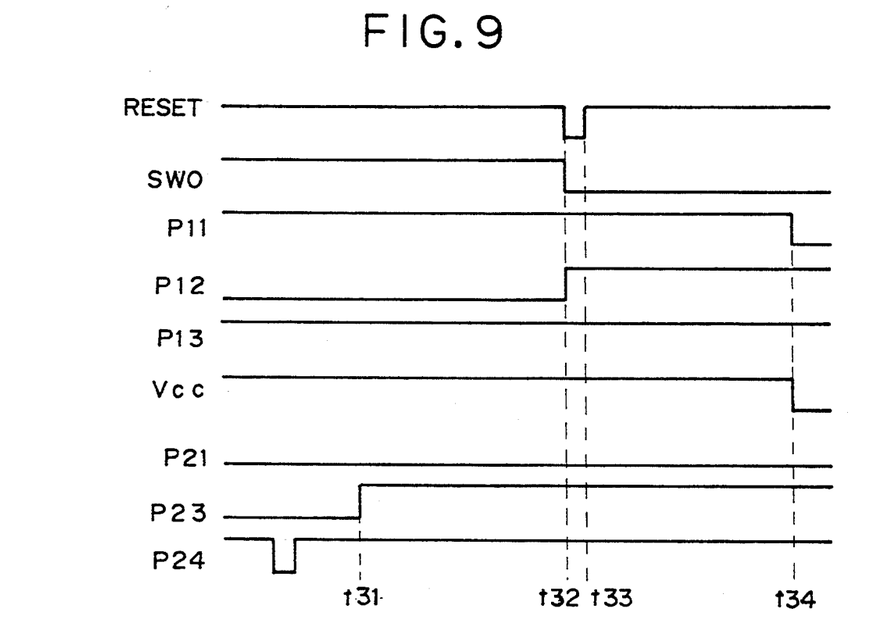
FIG. 9 shows a flow chart in an abnormal case when the main switch is turned off in the release sequence.

When the MCU1 proceeds from the step #7 to the step #8, it proceeds to the step #9 because the power off flag is "1" to render P12 ( Vcc hold signal ) to H. After the reset, the terminal P12 remains H and Vcc is turned off by the Vcc turn-off operation of the MCU2 by Table 1 (t27). FIG. 9 shows a flow chart of an abnormal operation in which the main switch is turned off in the release sequence.

In FIG. 9, t31, t32 and t33 correspond to t21, t23 and t24 of FIG. 8, respectively. When the MCU2 overruns by some reason, a periodic signal by the terminal P24 is not produced. Then, the MCU1 proceeds from the step #7 to the step #10, and the overflow is detected in the decision step of the overflow of the watch dog timer and the process proceeds to the step #11 to forcibly render P11 ( forced off signal ) to L. Then, Vcc is turned off even if the terminal P21 is L as shown in Table 1 (t34).

Since the power supply is turned off, a normal operation is initiated as shown in FIG. 6 when the main switch is next turned on. When the MCU1 overruns, it can be reset by turning off the main switch so that it is restored. In this case, if the MCU2 is normal, the release sequence operation is smoothly continued as shown in FIG. 8.

In accordance with the present invention, the system can be restored even if one of the microcomputers fails and the operation is smoothly continued even if it occurs in the course of sequence. While the present invention has been explained in connection with the camera, it may also be applicable to a system which uses a plurality of microcomputers and batteries.

What is claimed is:

1. A control system for a camera using a microcomputer, comprising:
   a first microcomputer; and
   a second microcomputer for conducting at least shutter control in a shutter release sequence;
   said first microcomputer deactivating said second microcomputer in accordance with a response output of said second microcomputer;
   said second microcomputer outputting a response at a predetermined interval in other than the shutter release sequence and outputting a response when a time for the shutter control exceeds a predetermined time in the shutter control in the shutter release sequence.

2. A control system for a camera according to claim 1 wherein said first microcomputer deactivates said second microcomputer when there is no response output from said second microcomputer for a predetermined time.

3. A control system for a camera using a microcomputer comprising:
   a first microcomputer; and
   a second microcomputer for conducting at least shutter control in a shutter release sequence;
   said first microcomputer being capable of resetting said second microcomputer in accordance with a response output of said second microcomputer;
   said second microcomputer outputting a response at a predetermined interval in other than the shutter release sequence and outputting a response when a time for the shutter control exceeds a predetermined time in the shutter control in the shutter release sequence.

4. A control system for a camera according to claim 3 wherein said first microcomputer resets said second microcomputer when there is no response output from said second microcomputer for a predetermined time.

* * * * *